Sept. 21, 1965 M. J. LAVET 3,207,965

ADJUSTABLE MECHANICAL OSCILLATOR FOR TIME-MEASURING APPARATUS

Filed July 22, 1963 3 Sheets-Sheet 1

Inventor
Marius J. Lavet
By
Wenderoth, Lind & Ponack
Attorneys

Sept. 21, 1965 M. J. LAVET 3,207,965

ADJUSTABLE MECHANICAL OSCILLATOR FOR TIME-MEASURING APPARATUS

Filed July 22, 1963 3 Sheets-Sheet 2

Inventor
Marius J. Lavet
By
Wenderoth, Lind & Ponack
Attorneys

Inventor
Marius J. Lavet
By
Wenderoth, Lind & Ponack
Attorneys

United States Patent Office
3,207,965
Patented Sept. 21, 1965

3,207,965
ADJUSTABLE MECHANICAL OSCILLATOR FOR TIME-MEASURING APPARATUS

Marius Jean Lavet, 36 Rue Gabrielle, Paris, France

Filed July 22, 1963, Ser. No. 296,833
Claims priority, application Switzerland, Aug. 11, 1962, 9,650/62
4 Claims. (Cl. 318—128)

Figure 1:
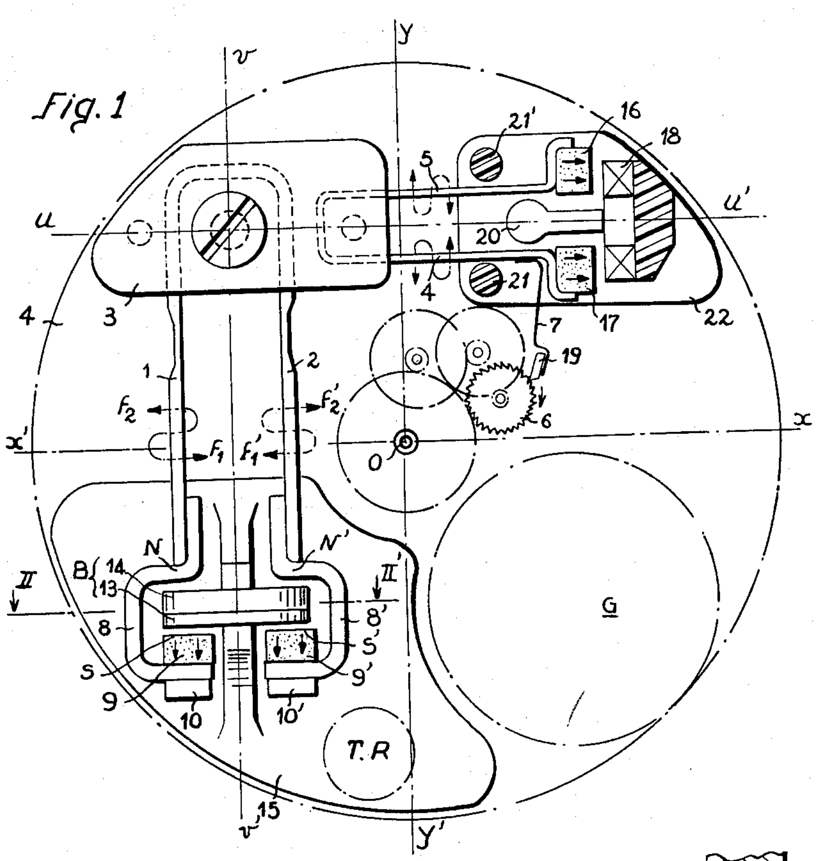

The present invention relates to an improvement in time-measuring apparatus and frequency standards, utilizing a regulator consisting of a double, isochronous, mechanical oscillator of the inertia/elasticity type, which is practically unaffected by gravitational forces.

In the following description, the improvements to which the invention relates have been primarily considered in their application, by way of example and without any limitation on the scope of the invention being thereby implied, to a time-keeping instrument regulated by two parallel flexible blades or strips having motion in opposite directions, like the tines of a tuning fork. Such a device is already employed in various types of electronic clocks and watches, but experience has shown that the forms of construction in use have serious drawbacks, as follows:

(1) It is very difficult to avoid transference, to the frame of the instrument, of a large part of the energy stored in potential kinetic form in the vibrating strips. The considerable forces of reaction exerted at the points of attachment of the flexed strips are not exactly neutralised when the vibrations of the associated masses are not maintained at the same amplitude and in strictly opposite phases. The details of construction at present used do not allow of the conjugate vibrations being brought into perfect symmetry, without long and costly trial-and-error methods. Consequently, the amplitude and phase difference of the vibrating strips are subject to erratic variations when the instrument is placed on a support that is resilient or lacks stability. These disturbance phenomena are especially marked and harmful in the case of light portable instruments, particularly in watches held more or less tightly by a wrist strap.

(2) Dissymmetry between the opposing magnetic and electro-magnetic actions is very troublesome and is accentuated in the long run when the vibro-motive forces are exerted by drives consisting of electro-magnets with cores of soft iron very close to ferro-magnetic limbs. In that case, lateral forces of attraction are produced, which interfere with the isochronism of the associated vibrators. Moreover, these forces fluctuate by reason of the magnetic hysteresis and remanence instability of the magnetised iron parts subjected to vibration and to variable fields.

(3) Unbalance in the forces of reaction on the frame arises after a certain period of use, when only one vibrating arm of the speed regulator is used to drive the hands through a click-and-ratchet and gear train. In that case, friction is increased and tends to reduce the amplitude of the driving arm. Inequality in the forces of inertia acting on the two associated strips gives rise to complications in construction and regulation. The fact is that, to equalise the amplitudes of the two vibrating strips, these have to be provided with electro-motive devices developing very different mechanical powers. These powers fluctuate unevenly in the event of voltage attenuation in the source used and of variations in the ambient temperature. Deterioration of the friction surfaces and of the lubricants and changes in the hygrometric condition of the atmosphere modify the relatively high damping of the actuating strip, causing variation in the phase difference between the conjugate vibrations. This may result in interference oscillation of the support and a loss of energy, which reduces the travel of the pawl and may even intermittently prevent the timing movement from functioning correctly.

It is an object of the present invention to eliminate wholly or partially the above-mentioned disadvantages, and to provide a regulator which makes possible the production of small independent time-pieces which are reliable in operation and consume very little electrical energy. The regulator has a control coil and a driving coil, which are flat and approximately rectangular in shape, superimposed and both without any iron core, their faces being perpendicular to parallel lines of force generated in space by two magnets rigidly attached to their respective vibrators, these lines of force and two opposite and substantially rectilinear faces of the said coils being perpendicular to the direction of vibration of the said vibrators; the two vibrators are individually adjusted beforehand with great precision so as to have identical natural frequencies; and the mid-plane through the assembly as a whole is at the same time the plane of symmetry of the mechanical arrangement formed by the two vibrators and of the electro-magnetic arrangement formed by the two magnets and the active sides of the two coils.

By virtue of this layout, the associated mechanical vibrators continually receive very small electro-magnetic forces and damping forces, which remain equal and act in opposite directions, normal to the plane of symmetry of the speed regulator; the resultant of the reactions on the frame of the instrument remains constantly nil. Moreover, the impulses which make the speed regulator self-sustaining are obtained from two symmetrical driving units acting on stationary windings without ferromagnetic cores, traversed by very weak intermittent currents, on small magnets disposed in two strongly polarised magnetic circuits interrupted by narrow gaps; the electromagnetic forces so obtained act in opposite directions on a considerable proportion of the conductors belonging to the electrical circuits acting on the two associated vibrators; these conductors are traversed by the same current, so that the vibro-motive forces, of opposite signs, which serve to sustain the vibrators, always remain absolutely equal in value, notwithstanding fluctuations in temperature and in the voltage of the electricity supply.

Figure 2:
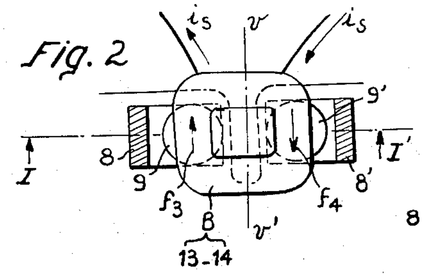
Figure 4:
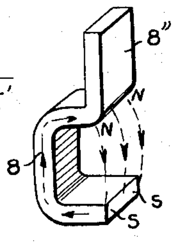
Figure 5:
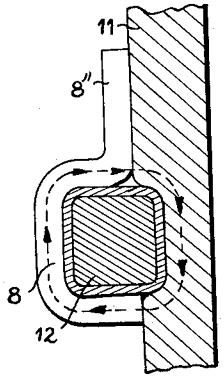
Figure 3:
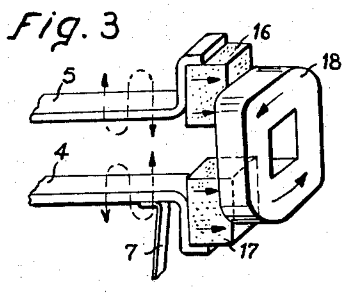
Figure 6:
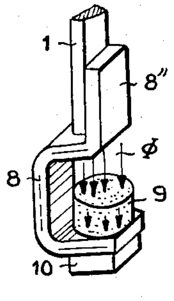
Figure 7:
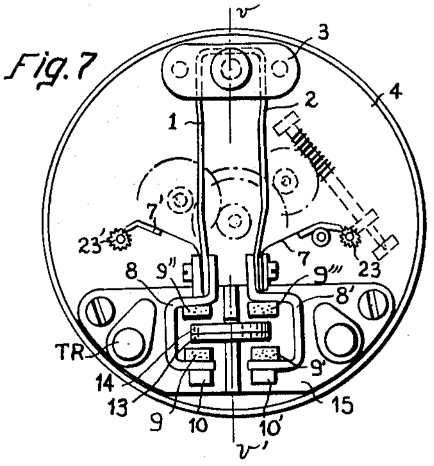
Figure 8:
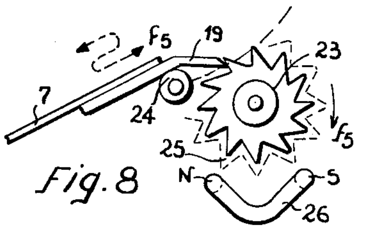
Figures 9, 11:
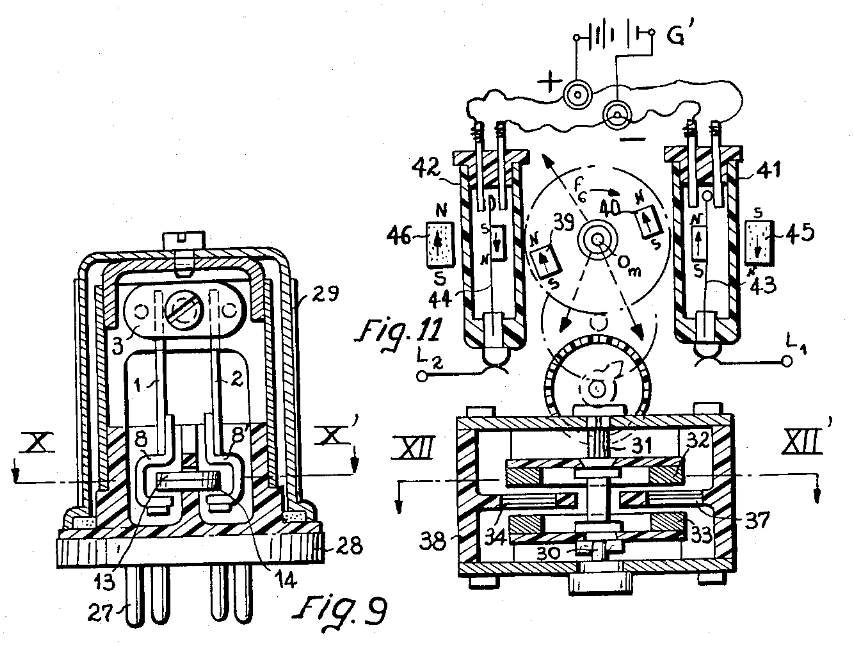
Figure 10:
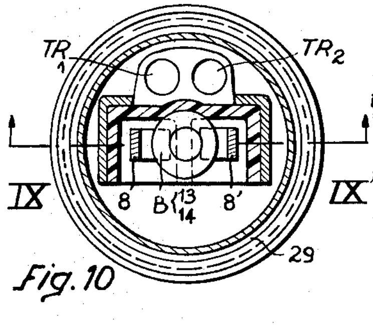
Figure 12:
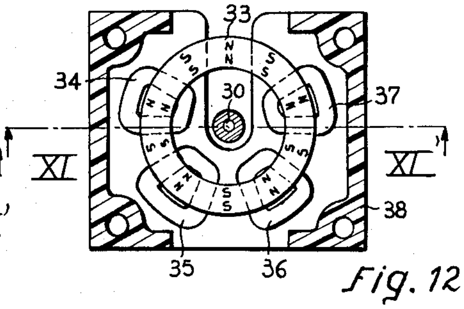
Figure 13:
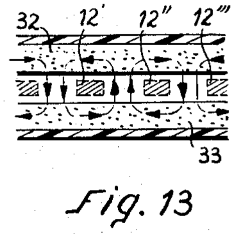
Figure 14:
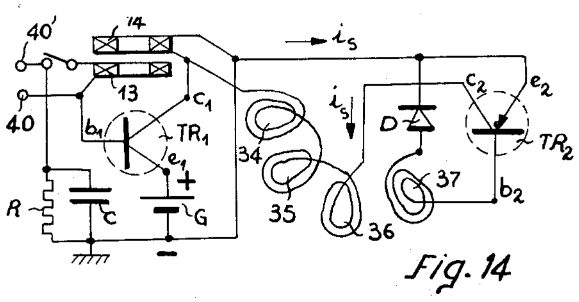

The novel features as well as the developments and special applications of the invention will be more clearly understood by reference to the following description and to the accompanying drawings, in which:

FIG. 1 is a large-scale side elevation showing the principal parts of a small time-piece incorporating the improvements to which the invention relates, FIG. 2 is a partial cross-section along the line II–II′ in FIG. 1 (looking in the direction of the arrows), FIG. 3 is a perspective view of part of the magneto-electric driving members of the servo-motor of the time-piece shown in FIG. 1, FIG. 4 is a perspective view of a magnet suitable for the speed-regulating vibrator used in the instrument shown in FIG. 1, FIG. 5 shows the special equipment whereby instantaneous polarised saturation of the magnet shown in FIG. 4 can be achieved, FIG. 6 is a perspective view of the end of one of the vibrators which make up the regulator of the instrument shown in FIG. 1, FIG. 7 is a side elevation of a very simplified form of construction as a variant of the instrument shown in FIG. 1, FIG. 8 shows part of the mechanical drive members of the instrument shown in FIG. 7, FIG. 9 is a partial cross-section through a vertical plane of a small standard unit for the emission of periodic signals, made up from the vibrating regulators of instruments constructed as in FIG. 1 or 7, enclosed in a sealed container provided with connection pins, FIG. 10 is a cross-section along the line X–X′ in FIG. 9, FIG. 9, FIG. 11 is a diagrammatic representation of a multipolar rotary servo-motor which may be used in place of the vibratory servo-motor in FIG. 1, this unit driving not only the hands, but also a periodical pole-reverser capable of operating a clock distribution circuit, FIG. 12 is a cros-section along the line XII–XII′ in FIG. 11, looking in the direction of the arrows, FIG. 13 is a laterally developed partial view showing the multi-polar permanent mangetisation in the receiving rotor in FIG. 11, and FIG. 14 is an example of an electrical circuit diagram for a time-keeping instrument incorporating a vibrating regulator of the type shown in FIG. 1 or FIG. 9, combined with a rotary servo-motor of the kind shown in FIG. 12.

The accompanying drawings should be regarded, to some extent, as diagrammatic sketches; in order to make the explanatory text clearer, only the principal operating parts have been drawn and described. Certain proportions set out in the specification have not been adhered to in the drawings; for example, very fine teeth and the very narrow gaps between pole faces, which cannot be shown by two separate lines.

Reference to FIGURE 1 will show that the time-keeper comprises essentially the following parts:

(a) A speed regulator, consisting of a pair of vibrating strips 1 and 2, the upper ends of which are retained in a solid support 3, screwed to the platen or base plate 4 of the mechanism, (b) A synchronised servo-motor, likewise consisting of a pair of vibrating strips 4 and 5, held in the support 3, its purpose being to operate a vibration-driven gear train, (c) A time-indicator gear-train, operated by a very fine toothed ratchet wheel 6, driven step by step by the action of a pawl 7, which is carried by the vibrating strip 4, (d) A source of electrical energy G, which may consist of a small dry battery or a sealed micro-accumulator of conventional type, (e) An electrically driven electro-magnetic device, which makes the vibrating strips self-sustaining at a constant frequency depending solely on the inertia and elasticity of the speed regulator.

The constructional details of the above parts are as follows:

The support 3 can be made economically by pressure casting in an alloy or a hardened plastics material of good stability.

The flexible strips 1 and 2 are made from a material the modulus of elasticity of which is not appreciably affected by the inevitable changes in ambient temperature. For example, these strips may consist of an iron/nickel/chromium alloy subjected to conventional physical treatment such as that commonly applied to the hair-springs of watches to raise the elastic limit of the metal and to lower the coefficient of thermo-elasticity within a range of a few dozen degrees on either side of the mean value of the ambient temperatures expected.

To the free ends of the strips 1 and 2 are fixed, by any suitable means (adhesive, solder or rivets), permanent magnets formed by parts 8 and 8′ and 9 and 9′. In addition, the vibrators are fitted with regulator inertia blocks 10 and 10′, made from a material with a low hardness index and readily yielding to the action of a steel tool or a grind-stone. The natural frequency of the strips 1 and 2 is reglated approximately beforehand in the course of production, by the appropriate thinning of those parts in the vicinity of the points of anchorage, as can be seen in FIGURE 1. The frequency regulation is subsequently completed by progressively reducing the inertia blocks 10 and 10′. This latter operation is analogous to the accepted practice of removing small amounts of material to achieve a perfect balance in the balance-wheels of alarm clocks.

One magnet 8 of the two similar magnets 8 and 8′ is shown in perspective in FIGURE 4. These magnets are made of a malleable material, rolled, bent and treated. It is preferable to use a cold-rolled strip made from an alloy known commercially as "Cunife," having a remanent magnetic induction of 5,400 gauss and a coercivity of 500 oersteds. It will be observed that each magnet such as 8 has bent parts shaped like a letter U, with horizontal arms, and has a vertical extension fixed to the end of the vertical strip 1.

The permanent magnetic saturation of each magnet 8 or 8′ is obtained by means of the equipment shown in FIGURE 5. Part 8 is placed against a ferro-magnetic bar 11, which is of high permeability and resistivity. A conductor 12, made of pure copper and of maximum cross-sectional area, protected by a thin coating of insulation, is inserted between 8 and 11. Through this bar is passed a short impulse of very heavy direct current (20,000 amperes, for example), obtained by the discharge of a battery of capacitors. A very intense magnetic field is formed, in which the lines of force pass round the conductor 12, as indicated by the arrows in FIGURE 5. After this, the U-bend in the part 8 remains strongly magnetised, so that an intense magnetic flux Φ is established between the poles N—N and S—S (FIGURE 4). This flux Φ can be strengthened by the addition of a pole magnet 9 to the lower arm of part 8, which magnet sould preferably consist of a high quality anisotropic material with very high coercivity (over 800 oersteds). This magnet 9 may be made in particular, from the alloy known as "Ticonal 1500," which has a maximum $B/H$ in excess of $5.10^6$ gauss-oersteds. The magnet composed of parts 8 and 9, weighted by an inertia block 10 for regulation, appears as shown in FIGURE 6.

The complete regulator comprises two vibrating strips of equal elasticity, fitted with similar magnets disposd symmetrically in relation to the vertical plane V–V′ shown in FIGURE 1. Between and close to the pole faces of the magnets is a stationary, very flat pancake coil B, the sides of which are traversed by the two magnetic fluxes Φ, both in the same direction, parallel to the direction of the strips 1 and 2 when at rest. This pancake coil is preferably approximately rectangular, as shown in the plan view in FIGURE 2; it has two coaxial windings 13 and 14, each consisting of several thousand turns of very fine enamelled copper wire. The windings are first coated with a very thin coating of thermoplastic varnish to form a block which is set in a support 15 moulded in an insulating material.

The winding 13 generates operating signals, while the winding 14 provides driving impulses. This double winding makes the speed regulator self-sustaining by means of an electronic amplifier, by the well-known process expounded in 1919 by Professors H. Abraham and H. Bloch in the proceedings of the Academy of Sciences, Paris, June 1919, volume 168, page 1197; however, constructional changes as described hereunder have been made in the equipment used by the said authors.

With the time-piece placed as shown in FIGURE 1 (strips 1 and 2 vertical when at rest), the sides of the windings 13 and 14 which give rise to electro-magnetic effects are perpendicular to the vertical lines of force in the magnetic fields created by the side magnets 8 and 8′. According to the invention, the conductor parts in question, hereinafter referred to as "active conductors," must be disposed symmetrically in relation to the vertical plane defined by the line $v$–$v'$. In the coil 14, therefore, there are equal numbers of active conductors connected in series respectively to the left and to the right of the plane $v$–$v'$, which defines at once the electrical magnetic and mechanical symmetry of the regulator. When the winding 14 is traversed by a direct current $i_s$, flowing in the direction of the arrows $f_3$ and $f_4$ in FIGURE 2, the facing magnets 8 and 8′ have mechanical forces applied to them perpendicular to the vectors representing the currents and magnetic inductions (electromagnetic actions given by Laplace's law). It will be observed that the forces in question are perpendicular to the plane of symmetry defined by the lines $v-v'$ (FIGURE 1) and $v''-v'''$ (FIGURE 2). These forces, acting respectively on the groups of conductors situated to the right and left of $v-v'$, are equal and opposite and cause the strips to deflect with the maximum efficiency by drawing magnets 8 and 8' together.

The winding 13 acts as a generator of an electric signal which is proportional to the speed of the magnets when the strips 1 and 2 take up vibrational motions of equal amplitudes and exactly opposite phase. The signal thus produced is an induced E.M.F.

In what follows, the two groups of voltage-generating conductors, disposed symmetrically in relation to the plane $v-v'$, will be referred to as "pick-up translators" of the vibrating strips 1 and 2. These pick-ups, consisting of the sides of one and the same coil 13, are connected in series, and the E.M.F.'s generated by displacement of the magnetic lines of force (displacement perpendicular to the conductors) are added algebraically at any given moment, their sum being at a maximum when the strips 1 and 2 pass simultaneously through their positions of equilibrium shown in FIGURE 1. The sign of the voltage at the terminals of 13 depends on the direction of displacement of the magnets 8 and 8'.

In accordance with the Abraham and Bloch method, the signal generated by the winding 13 is fed into an electronic amplifier relay. The output current from this passes through the winding 14 and exerts forces to sustain the vibrations. Thanks to recent progress in electronics, the amplifier may consist, for example, of a small crystal triode (or transistor) TR, set in the support 15 for the coils 13 and 14. Recourse may also be had to various familiar, but more complex, forms of construction, whereby one can reduce the size of winding 13 and cut down the release times of the output circuit comprising the source G and the winding 14.

In accordance with one of the purposes of the invention, it was recognised that there was great advantage in producing a combination of electronic, mechanical and magneto-electrical units, such as to give the following results in normal operation: the amplifier, under the action of the input current, should ensure a rapid change-over from the insulating condition to the good conducting condition in the electronic semi-conductors; it should also have non-linear characteristics, so that the resistance of the junctions of crystals in series with the coil 13 may become very low only when the vibrating strips approach each other in the directions $f_1$ and $f'_1$ at a speed very close to their maximum value; on the other hand, when the respective movements are made in the directions $f_2$ and $f'_2$, the strips moving apart and away from their positions of static equilibrium, the resistances of the semi-conductor junctions should remain extremely high. In this way, damping of the vibrations of the regulator is avoided by means of brief driving impulses acting only once per cycle, when the flexion of the strips is nil or very small. As is well known, such impulses do not disturb the periodicity of chronometer vibrators; hence, the frequency of vibration, on which depends the accuracy of the time-piece shown in FIGURE 1, is not appreciably disturbed by minor irregularities in the electro-magnetic forces.

The aim just described has been pursued by numerous research workers, but experience has shown that the mechanical and electro-magnetic devices produced prior to the present invention do not allow of adequate neutralisation of the effect of the fluctuating driving forces when these are distributed by an amplifier of transistor type that is highly sensitive to variations in ambient temperature.

One of the points of the present invention is that an important industrial step forward has been made by increasing the E.M.F. induced in the coil 13, the function of which is to produce maximum conductivity periodically in the transistor. This result is due to the constructional features (choice of materials, shapes and sizes of magnets and pancake coil) shown in FIGURES 1, 2 and 6. These features, in fact, make it possible to increase the lateral induced fluxes Φ and to reduce the inactive portions of the conductors in the induced winding 13.

Another feature of the invention lies in the use of novel means for ensuring perfect symmetry in the vibrations impressed on the facing magnets 8 and 8'. The usefulness of these means is due to the fact that when one rests content with the constructional symmetry obtainable by the normal processes of mass-production, for which considerable dimensional tolerances are necessary, one finds that the natural frequencies of the vibrators 1 and 2 often differ by more than one percent in their relative values. Each vibrator, being provided with a pick-up translator and a group of active conductors capable of sustaining it, can vibrate at its natural frequency. As a result, there is a continuous phase-change between the two associated vibrations and extremely harmful interference phenomena are observed: the base 2 receives lateral reaction forces augmented and diminished at long periodic intervals. The instrument is more or less under the control of the resultant force and the loss of a large part of the oscillatory energy of the speed regulator results in a considerably increased damping of the strips. The amplitudes of vibration of the magnets fluctuate erratically, since they are very much dependent on the instability of the instrument support.

Experimental research on the regulator shown in FIGURE 1 revealed that satisfactory synchronisation of the vibrational motions of the strips 1 and 2 could be obtained, so long as the natural periods of the associated vibrators were equalised with great precision beforehand. The adjsutment of the periods in question must be carried out with tolerances of less than $10^{-5}$ second. This adjustment is facilitated by the particular mode of construction of the regulator in FIGURE 1, it being merely necessary to carry out the following series of operations in the workshop:

Starting with inertia blocks 10 and 10' over-dimensioned prior to adjustment, material is removed progressively from block 10 and then from block 10', under the guidance of very precise measurements of the differences between the natural frequencies $F_1$ or $F_2$, of each vibrator strip and a reference frequency, F, supplied by a standard of very high quality. This standard should preferably consist of a piezo-electric quartz oscillator mounted in a thermostat and associated with a frequency divider constructed like those used in astronomical observatories. This conventional equipment can deliver a voltage at a very stable frequency F.

For methodical, reliable working, the instrument shown in FIGURE 1 is carefully fixed to a perfectly immobile support (a stout bracket set into a thick wall) and observations are first taken on the sustained vibration of the strip 1, the strip 2 being immobilised in some way.

The difference $F_1$ minus F is readily ascertained by means of various industrial instruments such as electronic meters and cathode-ray oscilloscopes. In particular, one may employ the comparative method familiar to radio-electricians, which consists in forming Lissajous figures on the screen of an oscilloscope.

Another method of adjustment which lies within the scope of the present invention consists in forming an information and control signal proportional to the beat frequency $(F_1-F)$ with the aid of a non-linear detector, to which are applied two voltages at frequencies of $F_1$ and F respectively, the first of these voltages being produced by amplification of the E.M.F induced in the winding 13. The signal thus obtained makes it possible to control, through an automatic or semi-automatic machine, a small milling cutter, which is used intermittently and very progressively on the inertia block 10 and which comes to a standstill as soon as the desired frequency adjustment has been obtained.

The natural frequency of the strip 2 is corrected in the same way, after releasing the strip 2 and fixing the strip 1. The operation of adjusting the double vibrator is then complete.

It should be noted that the standard frequency F considered above is slightly different from the ideal frequency $F_1$ to be impressed on the double vibrator if the exact time is to be indicated. This is due to the effect of the repulsion of magnets 8 and 8', which normally operate in phase opposition. The very slight difference $(f_1-F)$ can be readily determined from initial measurements made on prototype instruments.

A thorough theoretical study of normal operation shows that the synchronisation of the strips 1 and 2, the natural periods of which are extremely close together, arises from weak linkage forces due to the vicinity of the magnets 8–9 and 8'–9' and to the elasticity of the material in the bracket 3. This latter effect can be enhanced by making the bracket 3 from a slightly elastic material, such as nylon.

In the instrument shown diagrammatically in FIGURE 1, the speed regulator 1–2 does no mechanical work such as to disturb its precision; the hands are moved by a servo-motor that has an alternating motion, the parts of which appear on the right in FIGURE 1 and in the perspective drawing in FIGURE 3. This servo-motor comprises two parallel vibrating strips 5 and 6, fitted at their ends with small, light magnets 16 and 17 made of a material of high coercivity, which move in front of a flat coil 18, energised periodically at the same time as the speed regulator driving the coil 14. The strip 4 carries a pawl 7 formed from a flat strip with a toe-piece 19 made of very hard material; this causes a fine-toothed ratchet wheel 6 to advance step by step and so drives the gear train for the hands. This latter form of drive is in itself well known and is not part of the present invention. The internal lines of force in the magnets 16 and 17 are parallel to one another and to the direction of the strips 4 and 5, as shown by the arrows in FIGURE 3. The lines of force emerging from the pole faces tend to spread and the direct magnetic lossess between the magnets are very small. The sides of the coil 18 which are opposite the magnets form two groups of active conductors lying perpendicular to the lines of force leaving the magnets. Upon the coil being traversed by a direct current flowing in the direction of the arrows seen in FIGURE 3, the magnets 16 and 17 tend to come together. The dimensions of the strips 4 and 5 are such that the servo-motor is properly tuned to the frequency of the regulator 1–2 and acts as a double vibrator of the mechanical resonance type, both driven and synchronised by the current impulses received by the coil 18. The amplitudes of the vibrations imparted to the strips 4 and 5 are limited and regulated to relatively low values (less than 0.5 millimeter) by stops 20, 21, and 21', made of a material that has little elasticity and is sound-absorbent, these stops being fixed to the support 22 of coil 18.

Experience has shown that extraordinarily little electrical energy is needed for the synchronous operation of the servo-motor 4–5. Sufficient stabilisation of the travel of the pawl 19 can be obtained by applying the method described in French Patent No. 617,317, filed on October 28, 1925, in the name of the Societe Anonyme des Ets. Leon Hatot, under the title: "Improved Equipment for Synchronising Oscillatory Systems."

The speed regulator and servo-motor described above should preferably be grouped, as indicated in FIGURE 1, in a very shallow cylindrical case. This enables very compact time-keeper movements to be produced, suitable especially for wrist watches. In point of fact, the strips 1, 2, 5 and 6 and the magnets 8, 8', 16 and 17 can be made less than three millimetres wide; the width of the rectangular coils 13, 14 and 18 will then be less than six millimetres. The regulating and receiving vibrators are housed at right angles near to the periphery of the case and are above and to the right of the central arbor O (the spindle for the seconds hand). A battery (or accumulator) G, placed as shown in FIGURE 1, occupies the entire thickness of the case. The external dimensions of the complete movement can be less than thirty-five millimetres in diameter and eight millimetres in thickness. Between the associated vibrator strips and energy source G, the diameter of which amounts to about three-quarters of the radius of the case, there is sufficient space available to accommodate a time-wheel gear train made up of the usual small gear wheels that can be produced cheaply by the mechanical time-piece industry.

The small movement shown in FIGURE 1 is suitable, in particular, for travelling clocks, motor-car clocks, pocket alarms incorporating transistor radio receivers, etc. Features of this movement are its low consumption of mechanical and electrical energy and its precision, due to the fact that the symmetrical-vibration speed regulator has no oiled pivots and operates very freely, not having to drive the gear-train mechanism.

Some or all of the above improvements, relating to time-pieces with speed regulators of the tuning-fork type, can be applied to various types of more or less bulky time-pieces and emitters of periodic signals constructed with at least two symmetrical electro-mechanical oscillators incorporating elastic strips operating by flexion or torsion.

By way of further example, FIGURE 7 shows a small clock movement regulated and driven by two vibrators fitted with composite magnets and made self-sustaining with the aid of stationary double generator and driving windings as in FIGURE 1. The principal corresponding parts in the models illustrated in FIGURES 1 and 7 are indicated by the same reference numerals.

The magnets on each side of the plane of symmetry *v–v'* each have two small parts 9'' and 9''', made of material of high coercivity, which are cut by vertical lines of force (parallel to one another and to the direction of the strips). These magnets 9'' and 9''' are similar to those appearing in FIGURE 3. Control and driving flat windings 13 and 14 are mounted on the insulating support 15, which contains at least one transistor, TR, as well as the main leads to the source of energy. The active conductors in the stationary windings are situated, as shown in FIGURE 7, between the magnet pole faces, in the narrowest possible air gaps. The polarities of the magnet pole faces are so chosen that the electromagnetic forces produced when the winding 14 is traversed by a direct-current impulse tend to deflect the strips 1 and 2 in opposite directions. These actions are repeated once per period, the symmetry of the associated vibrations thus being assured, so that lateral reactions on the supports 3 and 15 can be eliminated.

In order to simplify the construction described earlier with reference to FIGURE 1, the timing ratchet wheel 23 is driven directly, instead of through a vibratory servo-motor. For this reason, the driving pawl 7 is carried by the strip 2; the disadvantages of this arrangement, however, are greatly lessened by the further details of construction described hereunder:

(1) The strip 1 is provided with a pawl 7', which acts on a ratchet wheel 23', offering the same moment of resistance as the wheel 23. By this means, the symmetry of the damping forces is assured, thereby eliminating an important cause of phase-change in the conjugate vibrations. Moreover, all the refinements of horological technique are employed in the making of the ratchet units 7–23 and 7'–23', to ensure that the passive forces of the drive are very small in relation to the forces of inertia and classic recovery of the symmetrical vibrators 1 and 2.

(2) Regularity in the operation of the timing gear train that works the hands is ensured, notwithstanding possible fluctuations in amplitude of the vibrations of the strip 2.

This latter condition is satisfied by constructing the ratchet unit 7–23 as shown in FIGURE 8. It will be seen that the ratchet wheel 23 has a small number of teeth—ten, for example—and that unduly deep penetration by the toe of the pawl 19 into these teeth is prevented by a fixed stop-piece 24 (consisting preferably of a rotary roller); should the travel of pawl 19 greatly exceed the pitch of the teeth 23, the advance of the toothed wheel 23 in the direction $f_5$ remains limited to that of one tooth, since the pawl, at the end of its travel, rises away from the tip of the tooth just moved. Reverse motion of the wheel 23 is completely prevented by its inertia and by a light magnetic skip-wheel consisting of a second wheel 25 of soft iron, rigidly fixed to wheel 23; the wheel 25, shown dotted in the drawing, has pointed teeth, which pass in front of the narrow N and S poles of a small magnet, 26, made of magnetic wire, placed as shown in FIGURE 8.

For the mechanical transmission, to drive the timing wheels for the hands, one can use two non-reversible gears in the form of a worm and tangential wheels (transmission drawn in dotted line in FIGURE 7). It will be observed that this drawing is a diagrammatic representation of a robust time-piece movement, which can be produced easily and cheaply if the plate 4 be given a diameter greater than four centimetres. The essential features of the improvements to which the invention relates have been preserved: complete symmetry of motive forces and passive resistances. Regularity of motion in the timing wheels is ensured, notwithstanding wide variations in the amplitude of the motive vibrations.

The auxiliary ratchet wheel 23 enables a driving spring to be slowly and progressively wound up, if desired, to constitute a mechanical energy store. A spring of this kind may be used to operate an audible alarm at predetermined times or time intervals, or to strike the hours and half-hours, or to set any other device in motion. These effects can be obtained by means of mechanisms well known in the mechanical horological technique.

FIGURES 9 and 10 show an interchangeable emitter of periodic signals, which constitutes a special application of the speed regulators embodied in the instruments illustrated in FIGURES 1 and 7. The symmetrical double vibrator 1–2, bearing magnets 8 and 8', is fixed inside a small air-tight case fitted with pins 27 for electrical connection purposes. The mounting for the coils 13 and 14 consists of a piece of moulded insulating material 28, which forms the base and frame of the device. This mounting has recesses to accommodate at least two transistors $TR_1$ and $TR_2$, one of which is intended for sustaining strips 1 and 2 and the other for energising a control circuit. A thin double sheath 29, made of a conductive metal and a highly permeable ferro-magnetic alloy, forms a screen to protect the chronometric vibrators from the action of electrical and magnetic disturbance fields. The device constructed in this way has the appearance of, for example, an ordinary electronic valve and may be used as a component in various combinations of instruments for which constant-frequency voltages or currents are required. In particular, very powerful clock movements can be produced by associating an emitter of periodic signals, as shown in FIGURE 9 (frequency preferably between 50 and 1,000 cycles), an adaptor-amplifier for these signals and a multi-polar synchronous motor rotating at a speed controlled accurately by the frequency of the speed regulator 1–2. The signal adaptor, in particular, may consist of an Eccles-Jordan trigger-circuit frequency divider, which can be assembled with transistors, using circuitry familiar to the technologist.

In the construction of powerful time-keeping equipment energised over long periods by batteries or accumulators of low capacity, it is essential that the speed regulators 1–2 be associated with low-consumption receiver motors. This can be achieved, in particular, by selecting driving units of the magneto-electric type, similar to those described with reference to FIGURES 3 and 7. Such a device is illustrated by the actual example shown in FIGURES 11 to 13, in conjunction with the circuit diagram in FIGURE 14.

The receiver unit combined with the emitter shown in FIGURE 9 comprises (FIGURE 11) a servo-motor with a vertical spindle 30, which rotates with uniform motion under the action of current impulses of a periodicity equal to or a multiple of that of the speed regulator 1–2. On the spindle 30, which is fitted with a driving pinion 31, are mounted two multi-polar magnets 32 and 33, which are in the form of coaxial rings (outside diameter of the magnets can be less than three centimetres) spaced a short distance apart, as shown in FIGURE 11. The magnets in question are made from some known material prepared from agglomerated oxide powders having an extremely high coercivity and a low specific gravity. (One may use, for example, the well known materials known commercially as "Ferroxdure I," "Spinal," "Plastoferrite," "Ferriflex," . . .)

On the circular opposite faces of the rings 32 and 33, a series of unlike poles (NN, SS, NN, SS, . . .) have been produced by means of a magnetising device such as that shown in FIGURE 5. FIGURE 13 shows, in the form of a profile developed from the plan, the cylindrical edge surfaces of the magnets and the form of the magnetic lines of force leaving and entering the coercive material. Such magnetisation can be readily obtained by placing between the magnets a conductor bent zig-zag fashion, 12', 12'', 12''', . . ., and passing through this conductor an impulse of very high intensity current. It will be noted that the annular gap between the magnets 32 and 33 is permanently traversed by a series of groups of lines of force in vertical and opposite directions.

FIGURE 12 represents the case of a rotor with five pairs of alternate poles, but a larger number of poles could be created for the purpose of reducing the annular velocity of the synchronous motor. The fixed winding of this motor consists of very flat pancake coils, 34, 35, 36, 37, . . ., disposed between the magnets, as shown in the cross-section and plan views in FIGURES 11 and 12. These coils are aproximately trapezoidal in shape and their sides, which run radially, pass simultaneously through two polar regions, NN and SS, when the turns are traversed by the intermittent driving current distributed by the signal emitter shown in FIGURE 9, supplemented if necessary by a frequency divider. In accordance with Laplace's law, currents which are perpendicular both to the motion and to the magnetic fields produce concordant electro-magnetic moments. The motor in question can therefore function as an ordinary tone wheel, but the novel construction enables the electrical performance to be considerably increased.

For simplicity in construction, the coils 34 to 37 may with advantage be housed in a thin wall of insulating material, with a cut-out for the passage of spindle 30 (FIGURE 12). This insulating wall may be attached to a moulded-plastics casing 38. The diameters of the motor pivots are kept as small as possible and sliding friction can be reduced by various conventional means, such as, for example, jewel bearings, miniature ball bearings or magnetic-repulsion bearings.

The small synchronous receiver described above has no salient pole pieces and its rotor turns very freely. It therefore operates on extraordinarily low electrical power (less than one milliwatt). The pivots have no tendency to vibrate and there is very little wear. Using the normal gearing, the rotor is capable of working the three hands of a time-piece, in addition to circuit-breakers or switches suitable for actuating clock receiving units of normal types.

An example of a device for generating current impulses which are reversed once every half-minute is given at the top of FIGURE 11. The vertical rotor spindle 30 drives, at a speed of one revolution per minute, a horizontal spindle $O_m$, which carries the seconds hand of the clock as well as a small plate fitted with micromagnets 39 and 40, made of a material of extremely high coercivity (magnets of orientated ferrite, of the Ferroxdure II type).

The magnets act alternately, by selective magnetic attraction and repulsion, on two switches 41 and 42, which form a change-over. The following improvements have been made in this device, the general principle of which is already known:

(a) The parts of the electrical contacts are located in hermetically sealed transparent tubes containing an inert gas.

(b) The resulting switches are interchangeable and can be readily replaced by inexpensive spares without the need for assistance by a horological specialist.

(c) The internal switch blades 43 and 44 are fitted with very light micro-magnets made of high-coercivity material and are held away from $O_m$ by external fixed magnets 45 and 46 respectively. The magnetic polarities to be observed to obtain the desired result are indicated in FIGURE 11 by arrows showing the directions of the internal lines of force.

This emission system works as follows: when the plate bearing the magnets 39 and 40 occupies the position shown in FIGURE 11, the switch blades are kept apart by the preponderant magnetic action of the magnets 45 and 46, but after slight rotation in the direction $f_6$, which brings the rotating magnets nearer to the switches, the blade 44, attracted by the magnet 39, is suddenly brought into contact with a conductor connected to the positive pole of the source G′, while the blade 43 remains connected to the negative pole of the source G′. Under these conditions, the time-piece circuit terminated at the terminals $L_1$ and $L_2$ receives a control signal in a particular direction. The current is then interrupted, and this is followed by a further emission in the opposite direction when the magnet 39 passes very close to the magnet of the blade 43.

The control device described above is extremely reliable in operation, since the electrical contacts are perfectly protected and the usual movement transmissions, functioning with unstable friction, have been eliminated.

The electrical connections between the signal emitter shown in FIGURE 1 or 9, the electronic amplifier and the magneto-electric motor shown for example in FIGURE 11 may be made in various ways. One relatively simple arrangement is shown very diagrammatically in FIGURE 14, from which it can be seen that windings 13 and 14 of the speed regulator are connected to the source G by means of a triode $TR_1$ (preferably of crystal type). The potential of the control electrode $b_1$ is maintained at a suitable value by means of the device (by no means new) consisting of blocking capacitor C and a large leak resistor R. At the terminals of the output circuit, containing the active conductors of the sustainer coil 14, are fitted driving coils 34, 35, 36, . . . of the synchronous motor shown in FIGURES 11 and 12.

To eliminate the risk of oscillation in the angular velocity of the rotor 32–33 and to reduce current consumption, a speed stabilising device may be used, which can come into operation as required and alter the duration of current impulses $i'_s$ in the windings 34, 35, 36, . . ., when the rotor speed increases in relation to the ideal mean speed corresponding precisely to the frequency of the speed regulator 1–2. This result could be obtained by means of a circuit breaker operated five times in each revolution of spindle 30, so that impulses $i'_s$ are cut short when the rotor advances unduly. An equivalent means, for which no moving circuit breaker is needed, can be obtained with the aid of an auxiliary transistor $TR_2$, shown on the right in FIGURE 14. The conductivity of this transistor depends on the coil 37, in which an E.M.F. is induced by the rotor magnets. The voltage at the terminals of the coil 37 acts between the emitter electrode $e_2$ and the control electrode $b_2$ of the transistor $TR_2$ when the diode D is conducting and the connections are so made that in normal operation the junctions of the crystals $TR_1$ and $TR_2$ are conducting. Under these conditions, the motor can operate as an ordinary tone wheel; however, should the rotor tend to advance, the E.M.F. induced in 37 is weakened and the semi-conductor junctions of $TR_2$ acquire increasingly high resistance, which interferes with the passage of current in the driving coils 34, 35 and 36. This results in slowing the rotor; and it will be clear that with normal running conditions a stable speed is automatically maintained by impulses of brief duration, which always occur when the active conductors of the stator are opposite the magnetic poles of the rotor. This operational feature enables the electrical performance of the motor to be considerably increased.

The time-keeping devices described above can be readily kept to exact time by means of periodic signals from an outside source. For example, the instrument shown in FIGURES 11–14, made with a local emitter of the kind illustrated in FIGURE 9, can be synchronised by a weak signal taken from an electrical distribution network, the mean frequency of which is regulated by the power station. For this, all that is needed is to neutralise the effect of the release winding 13 and to introduce the signal based on the mains frequency (in the form of a low alternating voltage) between terminals 40 and 40′, connected respectively to electrode $b_1$ of the transistor $TR_1$ and to the negative side of the source G. The transmission of the synchronising signal could be effected by remote wireless control. The instrument shown in FIGURE 11, completed in this way, is capable of operating independently in the event of accidental interruption in the mains voltage. This method enables the time recorded on a number of dials to be standardised.

The circuit shown in FIGURE 14 can be modified in various ways. In particular, one can control an electric motor with independent speed, comprising driving coils 34, 35, 36, . . ., release coil 37 and transistor $TR_2$. The principle of such a motor has been explained in Swiss Patent No. 276,248, filed June 30, 1951. There are several known means of imparting to the rotor 32–33 a mean speed in constant ratio to the frequency of the current delivered by the emitter in FIGURE 9: for example, one may apply the method of control described on page 109 of the book "Pendules Electriques," by Jean Granier (published in 1935 by Dunod, Paris).

The combinations of electro-mechanical oscillators and motors with alternating or rotary motion shown in FIGURES 1 and 11 have various applications to different techniques, more particularly in automatic installations, in measuring apparatus and equipment, in equipment for use in telecommunications . . . . These combinations, in fact, enable improved types of the following industrial instruments to be produced:

(1) Small marine chronometers capable of running independently for long periods; small, easily transportable master clocks; clocks with large dials; clocks for signs and publicity; time switches, the running of which is controlled by public electricity supply means; various kinds of stop-watches and timers; clocks with moving numerals; printing clocks for recording and totalling working hours in factories; equipment for timing sporting events; clocks for operating bells and sirens; constant-speed rollers for diagrams and information for recording instruments; measurement recorders and automatic time-based controls. (All these appliances can be obtained by using a small interchangeable emitter of the type shown in FIGURE 9, combined with an electronic amplifying adaptor and associated with synchronised or controlled servo-motors.)

(2) Generators of periodic currents, consisting of a low-frequency electric oscillator of LC (inductance/ capacity) type or RC relaxation (non-linear-resistance/capacity) type, stabilised by a double, symmetrical, electro-mechanical vibrator of the type shown in FIGURES 3, 7 and 9, provided with a single winding 14, to enable the NS gaps to be reduced. (For this application, one may use, in particular, the layout described in the journal "Annales Francaises de Chronometrie," No. 3–4, 1931, pages 246–247, published by the Societe Chronometrique de France in Besancon.)

(3) Selective resonance relays and electro-mechanical filters, consisting of an instrument of the type shown in FIGURE 7 or 9, provided with one driving winding 14, and operating only under the action of a periodical control current, the frequency of which is close to the natural frequency of the double symmetrical vibrator 1–2. (In this case, the coil 13 may with advantage be connected to a variable resistor to modify suitably the damping and selectivity of the relay, this damping arising from the currents induced by the movements of the magnets 8 and 8'.)

(4) Small electric motors with symmetrical vibration, operating intermittently, with which springs can be tensioned to act as mechanical energy stores.

This latter function can be fulfilled by means of the double self-sustaining vibrator shown in FIGURE 7, provided with a ratchet unit of the kind illustrated in FIGURE 8 and associated with speed reduction gearing. This system, combined with a starting and de-clutching device, applies in particular to the improvement of devices for the automatic re-winding of watches and small clocks regulated by a standard balance-wheel and escapement.

The foregoing description explains the basic principles of the present invention in sufficient detail to enable those skilled in the art to apply them with equal success in the mechanical, magnetic and electrical spheres, supplemented by a knowledge of the prior developments in the art.

I claim:

1. In a time measuring apparatus; an electrically maintained feed back type mechanical oscillator of tuning fork kind comprising two parallel tines, the free ends of which are adapted to vibrate in opposition, while remaining always equidistant from the longitudinal plane of symmetry of the oscillator, permanent magnets carried symmetrically by said tines near the free ends thereof, the direction of magnetisation of said permanent magnets being parallel to said plane of symmetry, a fixed pick up winding and a fixed driving winding forming together a substantially rectangular flat coil limited by planes perpendciular to said plane of symmetry and having its geometrical axis of symmetry lying in said plane of symmetry equidistant from said two tines, two opposite sides of said coil being rectangular flat coil limited by planes perpendicular to the magnetic field generated by said permanent magnets by which the active conductors forming said sides of the coil are influenced during the vibratory movements of said magnets, a source of direct current and an amplifier of a semi-conductor type fed by said source of D.C. current, said amplifier comprising an input circuit connected to the said pick-up winding and an output circuit connected to said driving winding, whereby said driving winding receives, after amplification, the periodic current pulses induced in the said puck-up winding by the vibratory movements of said magnets, means for individually adjusting the frequency of said vibrating tines and consisting of a small inertia block made of a soft material carried by each tine of which the natural frequency can be adjusted by progressively removing material from the corresponding inertia block.

2. In a time measuring apparatus according to claim 1, wherein said permanent magnets are formed of two steel strips magnetised and bent into U-shape, placed symmertically and open inwardly, one of the arms of each U-shaped piece being bent at right-angles upwardly and fixed to the free end of the corresponding vibrating strip so that said U-shaped piece extends outwardly beyond said strip, while said control winding and said driving winding connected thereto are disposed within the space formed by said two opposing U-shaped pieces and the active sides of the said windings are each placed between the two arms of the corresponding U-shaped magnet.

3. In a time measuring apparatus according to claim 1, wherein said permanent magnets are formed of two steel strips magnetised and bent into U-shape, placed symmetrically and open inwardly, one of the arms of each U-shaped piece being bent at right-angles upwardly and fixed to the free end of the corresponding vibrating strip so that said U-shaped piece extends outwardly beyond said strip, while said control winding and said driving winding connected thereto are disposed within the space formed by said two opposing U-shaped pieces and the active sides of the said windings are each placed between the two arms of the corresponding U-shaped magnet, at least one solid permanent magnet being in addition fixed inside said U-shaped pieces on one of the arms thereof and opposite said active side of said winding.

4. In a time measuring apparatus according to claim 1, wherein said permanent magnets are formed of two steel strips magnetised and bent into U-shape, placed symmetrically and open inwardly, one of the arms being bent at right-angles upwardly and fixed to the free end of the corresponding vibrating strip so that said U-shaped piece extends outwardly beyond said strip, while said control winding and said driving winding connected thereto are disposed within the space formed by said two opposing U-shaped pieces and the active sides of the said windings are each placed between the two arms of the corresponding U-shaped magnet, two small solid permanent magnets being in addition fixed inside each U-shaped piece on the two opposite arms on both sides of the active sides of said windings.

References Cited by the Examiner

UNITED STATES PATENTS

| | | | |
|---|---|---|---|
| 200,032 | 2/78 | Edison | 318—37 |
| 2,385,252 | 9/45 | Bennett | 58—107 |
| 2,433,160 | 12/47 | Rusler | 84—409 |
| 2,936,571 | 5/60 | Biemiller | 58—107 |
| 3,011,111 | 11/61 | Clifford | 318—128 |
| 3,020,425 | 2/62 | Steiner | 310—20 |
| 3,116,466 | 12/63 | Grib | 331—116 |

FOREIGN PATENTS

| | | |
|---|---|---|
| 432,299 | 7/35 | Great Britain. |
| 761,609 | 11/56 | Great Britain. |

OTHER REFERENCES

Electronic Tuning Fork Beats Time for Accuracy, Machine Design, October 27, 1960, pages 30, 31.

LEO SMILOW, *Primary Examiner.*

JOSEPH P. STRIZAK, *Examiner.*